US010814908B2

United States Patent
Isomoto et al.

(10) Patent No.: US 10,814,908 B2
(45) Date of Patent: Oct. 27, 2020

(54) LANE KEEPING CONTROL DEVICE

(71) Applicant: MAZDA MOTOR CORPORATION, Hiroshima (JP)

(72) Inventors: Kazunori Isomoto, Kure (JP); Shusaku Ombe, Hiroshima (JP); Tsuyoshi Arinaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 299 days.

(21) Appl. No.: 15/762,625

(22) PCT Filed: Nov. 9, 2016

(86) PCT No.: PCT/JP2016/083214
§ 371 (c)(1),
(2) Date: Mar. 23, 2018

(87) PCT Pub. No.: WO2017/082290
PCT Pub. Date: May 18, 2017

(65) Prior Publication Data
US 2018/0273089 A1 Sep. 27, 2018

(30) Foreign Application Priority Data
Nov. 12, 2015 (JP) .................................. 2015-221783

(51) Int. Cl.
*B60W 30/10* (2006.01)
*B62D 6/00* (2006.01)
(Continued)

(52) U.S. Cl.
CPC ............ *B62D 6/001* (2013.01); *B60W 30/12* (2013.01); *B62D 15/025* (2013.01);
(Continued)

(58) Field of Classification Search
USPC .............................................. 701/36, 41–44
See application file for complete search history.

(56) References Cited

U.S. PATENT DOCUMENTS 4,688,176 A * 8/1987 Hirata .................... G01C 21/30
701/445
7,546,896 B2 * 6/2009 Furusho ............... B62D 5/0463
180/446
(Continued)

FOREIGN PATENT DOCUMENTS

CN 102267462 A 12/2011
CN 103287429 A 9/2013
(Continued)

OTHER PUBLICATIONS

International Search Report issued in PCT/JP2016/083214; dated Feb. 14, 2017.

*Primary Examiner* — Jonathan L Sample
(74) *Attorney, Agent, or Firm* — Studebaker & Brackett PC

(57) ABSTRACT

A lane keeping control device performs lane keeping control to allow a host vehicle (V) to travel in a travel lane (21) in which the host vehicle is currently traveling. The lane keeping control device continues to perform the lane keeping control such that the host vehicle travels toward a branch road (30) ahead, when the branch road (30) has been detected, and a turn signal (WL) has been activated to indicate a direction toward the branch road (30).

8 Claims, 4 Drawing Sheets

LANE KEEPING CONTROL IS CONTINUED

(51) Int. Cl.
*G05D 1/02* (2020.01)
*B60W 30/12* (2020.01)
*B62D 15/02* (2006.01)
*G08G 1/16* (2006.01)

(52) U.S. Cl.
CPC ......... *G05D 1/0212* (2013.01); *G05D 1/0238* (2013.01); *G05D 1/0246* (2013.01); *G08G 1/167* (2013.01); *B60W 2420/42* (2013.01); *B60W 2540/20* (2013.01); *B60W 2554/00* (2020.02); *G05D 2201/0213* (2013.01)

(56) References Cited

U.S. PATENT DOCUMENTS

| | | | | |
|---|---|---|---|---|
| 2007/0290823 | A1* | 12/2007 | Watanabe | G08G 1/166 340/435 |
| 2009/0185718 | A1* | 7/2009 | Moritz | B60Q 1/085 382/104 |
| 2010/0023218 | A1* | 1/2010 | Hayakawa | B60W 10/20 701/42 |
| 2010/0253594 | A1* | 10/2010 | Szczerba | G08G 1/165 345/7 |
| 2010/0295668 | A1* | 11/2010 | Kataoka | B62D 15/025 340/435 |
| 2011/0282549 | A1* | 11/2011 | Choi | B60W 30/12 701/41 |
| 2012/0089300 | A1* | 4/2012 | Wolterman | G08G 1/09 701/36 |
| 2013/0018549 | A1* | 1/2013 | Kobana | B60K 28/06 701/41 |
| 2013/0063595 | A1* | 3/2013 | Niem | B60W 30/12 348/148 |
| 2013/0231830 | A1* | 9/2013 | Van Dan Elzen | B60W 10/04 701/42 |
| 2015/0360721 | A1* | 12/2015 | Matsuno | B60W 30/18163 701/41 |
| 2016/0357188 | A1* | 12/2016 | Ansari | G06K 9/00805 |

FOREIGN PATENT DOCUMENTS

| | | |
|---|---|---|
| JP | H07-19882 A | 1/1995 |
| JP | H09-91440 A | 4/1997 |
| JP | 2002-340603 A | 11/2002 |
| JP | 2008-268157 A | 11/2008 |
| JP | 2009-143309 A | 7/2009 |
| JP | 2010-030386 A | 2/2010 |
| JP | 2011-233151 A | 11/2011 |
| JP | 2015-115040 A | 6/2015 |

* cited by examiner

LANE KEEPING CONTROL DEVICE

TECHNICAL FIELD

The technology disclosed herein relates to lane keeping control devices.

BACKGROUND ART

More and more vehicles, particularly cars, are becoming equipped to apply a lane keeping assist torque for steering toward the opposite direction (i.e., toward the central position of the lane) from that in which the vehicle departs from a lane, in order to assist in keeping the vehicle's lane, i.e., to prevent or reduce lane departure, during traveling. This reduces steering force toward the direction in which the lane keeping assist torque is applied, and therefore, the driver is naturally guided back toward the central position of the lane. Needless to say, the magnitude of the lane keeping assist torque is limited to that which can be overcome by the driver so that the torque does not impede the driver's steering when the driver actively changes lanes, etc.

In this lane keeping control, typically, the lane width of a lane in which a host vehicle is traveling is detected using a camera, etc., and the host vehicle is guided toward a target point, more particularly a travel line passing through the central position of the detected lane width.

There is a case where, during lane keeping control, a lane in which a host vehicle is traveling branches (e.g., into two) ahead of the host vehicle. In this case, the lane width, which is detected by a lane width detection means, gradually becomes wider toward a branching portion. In such a case where the lane width gradually becomes wider, the vehicle is heading toward a branching portion, and therefore, unless a turn signal is activated, it is unclear which road the driver intends to take. It has been proposed that, in such a case, lane keeping control should be suspended (see PATENT DOCUMENT 1). PATENT DOCUMENT 2 describes a technique of warning the driver if it appears that the vehicle is beginning to depart from its lane, in which when there is a branch road ahead of the vehicle, an imaginary lane on which lane departure warning is based is inferred on the basis of the active or inactive state of a turn signal (direction indicator).

CITATION LIST

Patent Document

PATENT DOCUMENT 1: Japanese Unexamined Patent Publication No. 2015-115040
PATENT DOCUMENT 2: Japanese Unexamined Patent Publication No. 2011-233151

SUMMARY

Technical Problem

Incidentally, in the case of PATENT DOCUMENT 1, when there is a branch road ahead, the lane width gradually becomes wider and therefore lane keeping control is stopped. This reduces opportunities to carry out lane keeping control, which is not preferable.

With the above circumstances in mind, the technology disclosed herein has been made. It is an object of the technology disclosed herein to provide a lane keeping control device that can further increase opportunities to carry out lane keeping control when there is a branch road ahead.

SUMMARY OF THE INVENTION

To achieve the above object, the technology disclosed herein employs the following solution. Specifically, the device disclosed herein is a lane keeping control device for performing lane keeping control to guide a host vehicle toward a guidance target point set in a travel lane in which the host vehicle is currently traveling, including:

a turn signal activation detector configured to detect activation of a turn signal performed by a driver;

a branch road detector configured to detect a branch road ahead of the host vehicle; and a control continuator configured to continue to perform the lane keeping control such that the host vehicle travels toward a branch road ahead, when the branch road detector has detected the branch road ahead, and the turn signal activation detector has detected activation of a turn signal indicating a direction toward the branch road ahead.

According to the above technology, when activation of a turn signal indicating a direction toward a branch road ahead has been detected, the lane keeping control continues to be performed. This can increase opportunities to perform the lane keeping control.

Preferable embodiments based on the above technology are as follows.

The lane keeping control device further includes a restrainer configured to have priority over the control continuator, and restrain the control continuator from continuing to perform the lane keeping control, when there is an opposing lane between the host vehicle and the branch road ahead. In this case, when an opposing lane is crossed, the lane keeping control is not allowed to be continued. This preferably ensures safety.

The control continuator is configured such that when the turn signal activation detector has detected activation of a turn signal indicating a turn to the left, the control continuator performs the lane keeping control on the basis of a left end position of a lane width. In this case, the lane keeping control can be preferably suited to a direction in which the host vehicle turns.

The control continuator is configured such that when the turn signal activation detector has detected activation of a turn signal indicating a turn to the right, the control continuator performs the lane keeping control on the basis of a right end position of a lane width. In this case, the lane keeping control can be preferably suited to a direction in which the host vehicle turns.

The lane keeping control device further includes:

a lane change detector configured to detect lane change of the host vehicle; and a restrainer configured to have priority over the control continuator, and restrain the control continuator from continuing to perform the lane keeping control, when the turn signal activation detector has detected activation of a turn signal, and the lane change detector has detected lane change. In this case, in merely lane change, the lane keeping control is not allowed to be continued. This preferably prevents or reduces a situation where the lane keeping control is performed contrary to the driver's intention to change lanes.

The control continuator is configured such that when the turn signal activation detector has detected activation of a turn signal indicating a direction toward the branch road ahead, the control continuator performs the lane keeping control such that the vehicle is moved closer to an edge of a lane in which the vehicle is currently traveling, the edge being located in the direction indicated by the activated turn signal. In this case, the host vehicle is previously moved closer to a lane edge located in the direction of a turn. Therefore, the host vehicle can smoothly change direction, and a following vehicle can preferably recognize the turning of the host vehicle.

The lane keeping control device further includes:

an obstacle detector configured to detect an obstacle at a side of and behind the vehicle.

The control continuator performs the lane keeping control such that the vehicle is moved closer to an edge of a lane in which the vehicle is currently traveling, the edge being located in the direction indicated by the activated turn signal, provided that the obstacle detector has detected the absence of an obstacle at a side of and behind the vehicle, the side being located in the direction indicated by the activated turn signal. In this case, the host vehicle can be moved closer to a lane edge, taking into consideration an obstacle (in particular, a motorcycle) at a side of and behind the host vehicle.

A lane keeping control device as disclosed herein includes: a turn signal switch configured to detect activation of a turn signal performed by a driver; a camera configured to capture an area ahead of a host vehicle; and a controller configured to perform lane keeping control so as to receive a captured image signal from the camera, and output a control signal to an electric power steering device so that the vehicle is guided toward a guidance target point set in a travel lane in which the vehicle is currently traveling, the guidance target point being based on the captured image signal. When the controller has detected a branch road ahead of the host vehicle on the basis of the captured image signal from the camera, and has received, from the turn signal switch, a turn signal activation signal indicating a direction toward the branch road ahead, the controller continues to perform the lane keeping control such that the vehicle travels toward the branch road ahead.

Advantages of the Invention

The technology disclosed herein can increase opportunities to carry out lane keeping control.

DESCRIPTION OF EMBODIMENTS

Figure 1:
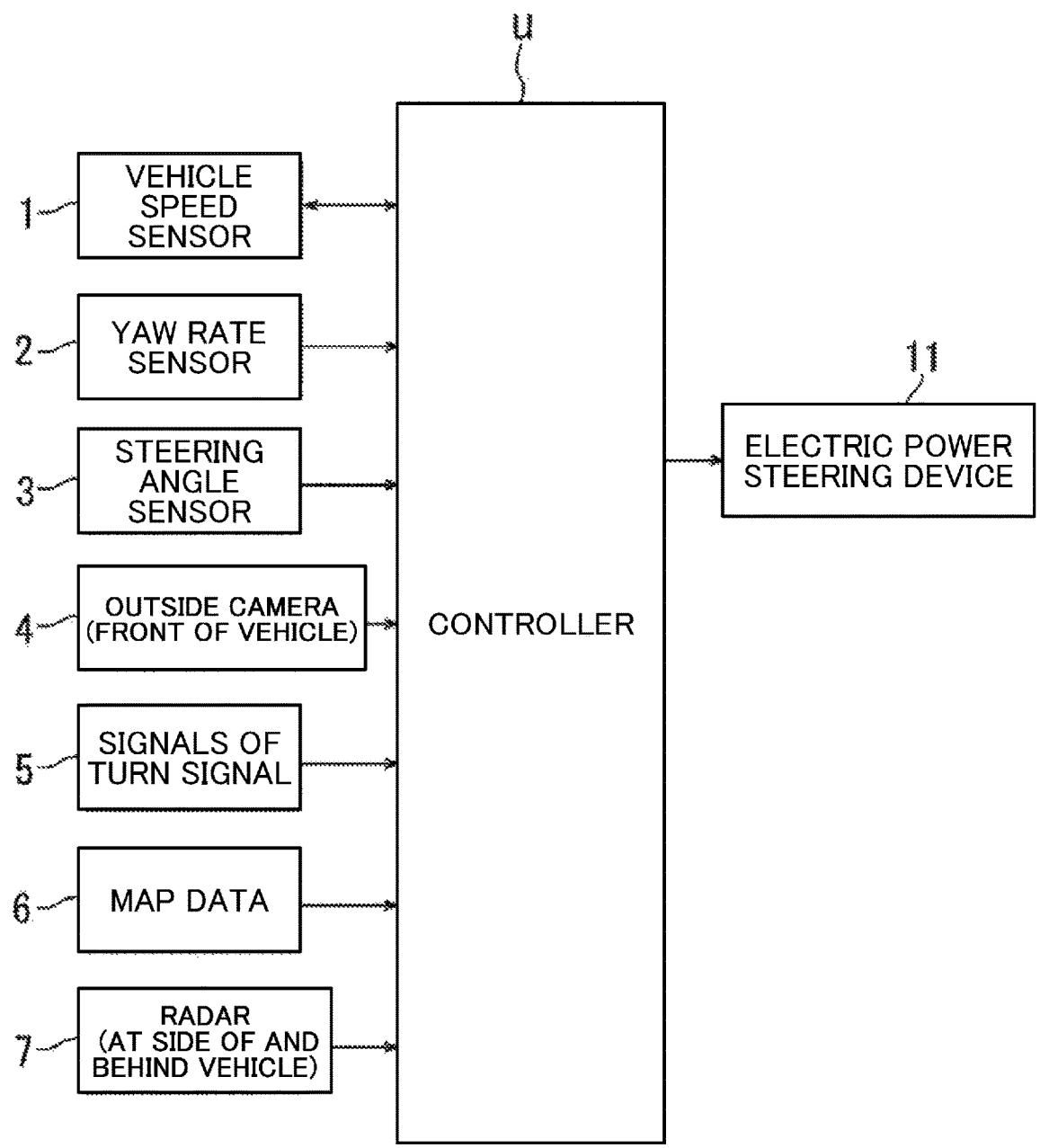
FIG. 1 is a block diagram showing an example control system for a vehicle including a lane keeping control device.

FIG. 1 is a block diagram showing a configuration of a control system for a vehicle (e.g., a car) equipped with a lane keeping control device. As shown in FIG. 1, the control system includes a controller (control unit) U that is configured using a microcomputer. The controller U receives signals from a vehicle speed sensor 1, a yaw rate sensor 2, a steering angle sensor 3, a camera 4 for capturing an image of an area ahead of the vehicle, a turn signal switch 5, a map data (navigation device) 6, and a radar 7 for detecting an obstacle at the left or right side of and behind the vehicle. The controller U controls an electric power steering device 11 during lane keeping control. The camera 4 detects white lines (lane markings) that are the opposite boundaries of a lane in which the vehicle is traveling, or a road shoulder.

Figure 2:
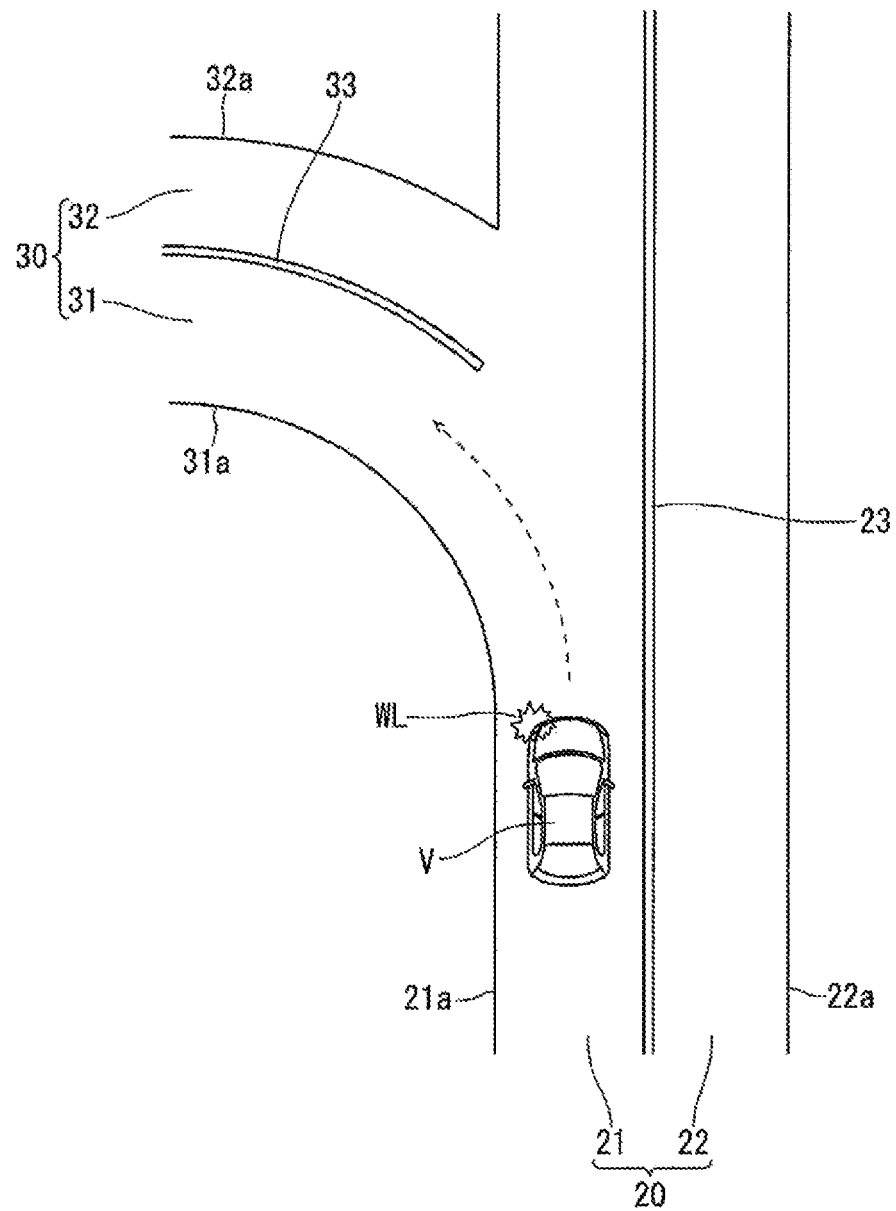
FIG. 2 is a diagram for describing an outline of lane keeping control.

FIG. 2 shows a situation where a vehicle V that is a host vehicle is traveling on a road 20. In this embodiment, it is assumed that vehicles are driven on the left side of the road (left-hand traffic). The road 20 has one lane on each side. A lane in which the vehicle V is traveling is indicated by the reference character 21, and the opposing lane is indicated by the reference character 22. A central boundary line between the lanes 21 and 22 is indicated by the reference character 23. The lane 21 is demarcated by the central boundary line 23, which is a white line, and another white line 21a (a white line may be represented by a single line, and this is also true of another figure). The lane 22 is demarcated by the central boundary line 23, which is a white line, and another white line 22a.

The road 20 extends straight ahead of the vehicle V. The road 20 has, ahead of the vehicle V, a branch road 30 that branches off the lane 21, curving to the left. The branch road 30 is a two-lane road having one lane in each direction, i.e., a left lane 31 and a right lane 32. The central boundary line of the branch road 30 is indicated by the reference character 33. The lane 31 is demarcated by the central boundary line 33 and the white line 31a. The lane 32 is demarcated by the central boundary line 33 and the white line 32a.

When the vehicle V is located before the branch road 30, a distance between the central boundary line 23 and the white line 21a is detected as a width of the lane 21 by a camera mounted on the vehicle V, and lane keeping control is performed using a central position of the lane width as a target point toward which the vehicle V is guided (guidance target point). Note that lane keeping control may be performed using techniques in the related art, such as those disclosed in PATENT DOCUMENT 1 above, Japanese Unexamined Patent Publication Nos. 2016-011060 and 2016-148893, filed by the present applicant, etc.

In FIG. 2, the vehicle V is located slightly before the branch road 30. The left turn signal has been activated to indicate that the vehicle V is to enter the branch road 30. The blinking turn signal is indicated by the reference character WL.

In a junction portion of the road 20 and the branch road 30, the lane width gradually becomes wider. In PATENT DOCUMENT 1, lane keeping control is stopped (suspended). In the technology disclosed herein, even in the case where the lane width gradually becomes wider, lane keeping control is continued, provided that a turn signal has been activated to indicate a turn toward the direction of the branch road 30 (an increase in opportunities to carry out lane keeping control).

Figure 3:
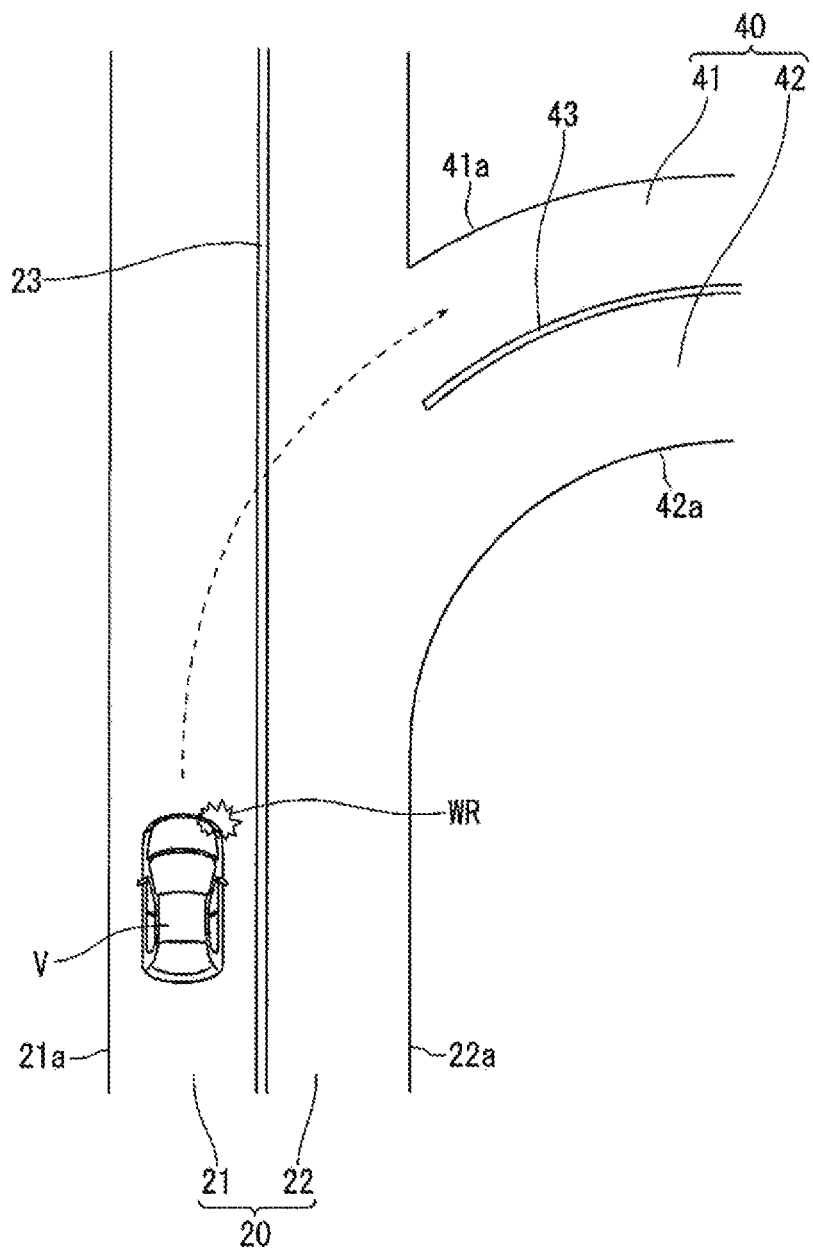
FIG. 3 is a diagram for describing an outline of lane keeping control.

Meanwhile, in FIG. 3, a branch road 40 branches off a road 20, curving to the right. The branch road 40 branches off a right lane 22. The branch road 40 is a two-lane road having one lane in each direction, i.e., a left lane 41 and a right lane 42. The central boundary line of the branch road 40 is indicated by the reference character 43. The lane 41 is demarcated by the central boundary line 43 and a white line 41a. The lane 42 is demarcated by the central boundary line 43 and a white line 42a.

In FIG. 3, the right turn signal has been activated to indicate that the vehicle V is to enter the branch road 40. The blinking turn signal is indicated by the reference character WR. In FIG. 3, when the vehicle V is traveling in the left lane 21, the vehicle V needs to cross the opposing lane 22 in order to enter the branch road 40. The danger of an opposing vehicle increases during crossing of the lane 22. Therefore, lane keeping control is not continued, i.e., is stopped (temporarily suspended). After the driver has steered the vehicle V on their own to enter the branch road 40, lane keeping control is resumed.

Figure 4:
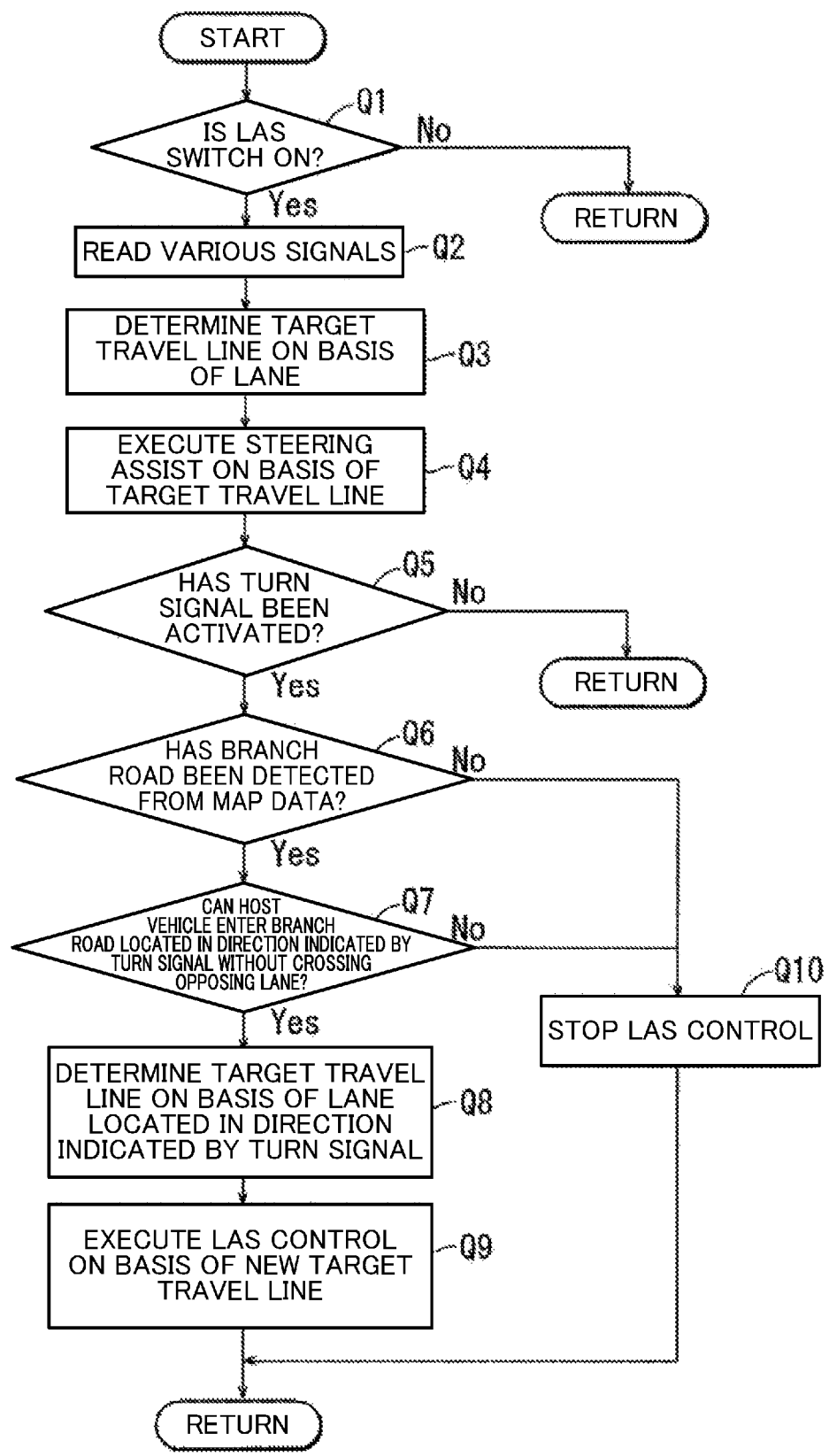
FIG. 4 is a flowchart showing an example of lane keeping control.

Next, a specific example of lane keeping control disclosed herein will be described with reference to a flowchart shown in FIG. 4. Note that, in the description that follows, the reference character Q represents a step. Initially, in Q1, it is determined whether or not an LAS switch (a switch that is manually operated to determine whether or not lane keeping control is to be carried out) (not shown) is on. If the determination result of Q1 is negative (NO), lane keeping control is not carried out, and control is directly returned.

If the determination result of Q1 is positive (YES), signals are read from the sensors 1-7 in Q2. Thereafter, in Q3, a target travel line is determined on the basis of a lane. In the case of FIG. 2, the target travel line connects between the vehicle V, and a middle position between the central boundary line 23 and the white line 21a (including the exactly middle position, or alternatively, a position near the exactly middle position and slightly closer to the central boundary line 23 or to the white line 21a). After Q3, in Q4 lane keeping is performed by applying a steering assist torque determined such that the vehicle V travels along the target travel line.

After Q4, in Q5 it is determined whether or not a turn signal has been activated. If the determination result of Q5 is negative (NO), control is directly returned (lane keeping control is continued). If the determination result of Q5 is positive (YES), in Q6 it is determined on the basis of map data whether or not there is a branch road ahead. If the determination result of Q6 is positive (YES), in Q7 it is determined whether or not the vehicle V can enter the branch road ahead without crossing an opposing lane (e.g., the determination is made on the basis of map data). The presence or absence of a branch road may be detected using the camera 4 (if a gradual increase in lane width is detected using the camera 4, it may be determined that there is a branch road).

If the determination result of Q7 is positive (YES), in Q8 a target travel line (guidance target point) is determined on the basis of a lane located in a direction indicated by the turn signal (in the case of FIG. 2, the white line 21a, 31a). Specifically, lane keeping control is performed on the basis of recognition that the white line 21a, 31a is a left end of a lane width. In this case, the lane width that is defined, assuming that the left white line 21a, 31a is a left end of the lane width, may be a lane width of the lane 21 before the vehicle V has entered the lane 31, and a line width between the central boundary line 33 and the white line 31a after the vehicle V has entered the lane 31. Thereafter, in Q9, lane keeping control is continued such that the vehicle V travels in the travel line determined in Q8. In the lane keeping control including Q8 and Q9, the vehicle V moves from the lane 21 to the lane 31.

If the determination result of Q6 is negative (NO), in Q10 lane keeping control is stopped (it is determined that the vehicle is beginning to change lanes). If the determination result of Q7 is negative (NO), control proceeds to Q10, in which lane keeping control is also suspended. A situation where control proceeds from Q7 to Q10 corresponds to control that is performed when the vehicle V crosses the opposing lane 22 as shown in FIG. 3.

Here, as shown in FIG. 2, when the vehicle V moves from the lane 21 in which the vehicle V is currently traveling to the lane 31 of the branch road 30, lane keeping control may be performed as follows. Initially, before the vehicle V enters the lane 31, lane keeping control is performed such that the vehicle V moves closer to a left edge of the lane 21 (the guidance target point is set to be closer to the left edge than is the center of the lane 21). As a result, the vehicle V can smoothly move to the lane 31, and change in direction toward the left side, i.e., turning to the left, can be more clearly presented to a following vehicle.

When lane keeping control is performed such that the vehicle V moves closer to a left edge of the lane 21, the lane keeping control can be performed, provided that there is not an obstacle (particularly, a motorcycle) at the left side (to which the vehicle moves) of and behind the vehicle V (the radar 7 is used to detect the presence or absence of an obstacle at the left side of and behind the vehicle V).

Here, even when there is the branch road 30 ahead of the vehicle V, and a turn signal of the vehicle V has been activated to indicate a turn to the left, lane keeping control is preferably not allowed during lane change. Specifically, when there is another travel lane at the left side of the lane 21 in which the vehicle V is currently traveling, which is detected using, for example, map data or the camera 4, it is determined that lane change is beginning, and lane keeping control is not allowed (lane change can be distinguished from a turn to the left on the basis of a positional relationship between the lane 21 in which the vehicle V is currently traveling and another lane).

In this embodiment, it is assumed that vehicles are driven on the left side of the road (left-hand traffic). The technology disclosed herein is similarly applicable when vehicles are driven on the right side of the road (right-hand traffic). In the case of right-hand traffic, in FIG. 2 the vehicle V is traveling in the lane 22, and therefore, the vehicle V needs to cross the opposing lane 21 in order to enter the branch road 30. In this case, lane keeping control is not allowed to be continued. Meanwhile, in the case of FIG. 3, the vehicle V is traveling in the lane 22, and therefore, the vehicle V does not need to cross the opposing lane 21 in order to enter the branch road 40. Therefore, lane keeping control is continued, provided that a turn signal has been activated to indicate a turn to the right.

In the foregoing, embodiments have been described. The technology disclosed herein is not limited to the above embodiments. Changes may be made as appropriate without departing from the scope as set forth in the appended claims. The lane width may be specified using a road shoulder instead of a white line (or a broken line equivalent to a white line). When lane keeping control is continued during a turn to the right, the lane keeping control may be performed with reference to a right white line (the right white line is recognized as a right end of the lane width). When there is a branch road ahead, and a turn signal has been activated to indicate a turn toward the direction of a branch road, lane keeping control may be continued, provided that the driver turns the steering wheel toward the direction indicated by the turn signal that has been activated (this is detected by the steering angle sensor 3) (lane keeping control is continued if it is clearly recognized that the driver intends to drive toward the direction indicted by the turn signal that has been activated). Each step or a group of steps of the flowchart indicates a function of the controller U. Therefore, if the term "means" is modified by functional language for each step or a group of steps, the resultant means can be regarded as a constituent element of the controller U. The purpose of the technology disclosed herein is not limited to what has been explicitly described hereinabove, and implicitly includes providing what has been expressed as being substantially preferable or advantageous.

INDUSTRIAL APPLICABILITY

The technology disclosed herein can ensure sufficient opportunities to carry out lane keeping control of a vehicle.

DESCRIPTION OF REFERENCE CHARACTERS

U Controller
1 Vehicle Speed Sensor
2 Yaw Rate Sensor
3 Steering Angle Sensor
4 Camera
5 Turn Signal Switch
6 Map Data (Navigation Device)
7 Radar (For Detection Of Obstacle At Either Side And Behind)
V Vehicle
20 Road
21 Lane
21a White Line
22 Lane
22a White Line
23 Central Boundary Line
30 Branch Road (Branch Road That Vehicle Enters Without Crossing Opposing Lane)
31 Lane
32 Lane
33 Central Boundary Line
31a White Line
32a White Line
40 Branch Road (Branch Road That Vehicle Enters After Crossing Opposing Lane)
41 Lane
41a White Line
42 Lane
42a White Line
43 Central Boundary Line

The invention claimed is:

1. A lane keeping control device for performing lane keeping control to guide a host vehicle toward a guidance target point set in a travel lane in which the host vehicle is currently traveling, comprising:
 a turn signal activation detector configured to detect activation of a turn signal performed by a driver;
 a branch road detector configured to detect a branch road ahead of the host vehicle;
 a control continuator configured to continue to perform the lane keeping control such that the host vehicle travels toward a branch road ahead, when the branch road detector has detected the branch road ahead, and the turn signal activation detector has detected activation of a turn signal indicating a direction toward the branch road ahead, and
 a restrainer configured to have priority over the control continuator, and restrain the control continuator from continuing to perform the lane keeping control, when there is an opposing lane between the host vehicle and the branch road ahead.

2. The lane keeping control device of claim 1, wherein when the turn signal activation detector has detected activation of a turn signal indicating a turn to the left, the control continuator performs the lane keeping control on the basis of a left end position of a lane width.

3. The lane keeping control device of claim 1, wherein when the turn signal activation detector has detected activation of a turn signal indicating a turn to the right, the control continuator performs the lane keeping control on the basis of a right end position of a lane width.

4. The lane keeping control device of claim 1, further comprising:
 a lane change detector configured to detect lane change of the host vehicle; and
 a restrainer configured to have priority over the control continuator, and restrain the control continuator from continuing to perform the lane keeping control, when the turn signal activation detector has detected activation of a turn signal, and the lane change detector has detected lane change.

5. The lane keeping control device of claim 1, wherein when the turn signal activation detector has detected activation of a turn signal indicating a direction toward the branch road ahead, the control continuator performs the lane keeping control such that the vehicle is moved closer to an edge of a lane in which the vehicle is currently traveling, the edge being located in the direction indicated by the activated turn signal.

6. The lane keeping control device of claim 5, further comprising:
 an obstacle detector configured to detect an obstacle at a side of and behind the vehicle, wherein
 the control continuator performs the lane keeping control such that the vehicle is moved closer to an edge of a lane in which the vehicle is currently traveling, the edge being located in the direction indicated by the activated turn signal, provided that the obstacle detector has detected the absence of an obstacle at a side of and behind the vehicle, the side being located in the direction indicated by the activated turn signal.

7. A lane keeping control device comprising:
 a turn signal switch configured to detect activation of a turn signal performed by a driver;
 a camera configured to capture an area ahead of a host vehicle; and
 a controller configured to perform lane keeping control so as to receive a captured image signal from the camera, and output a control signal to an electric power steering device so that the vehicle is guided toward a guidance target point set in a travel lane in which the vehicle is currently traveling, the guidance target point being based on the captured image signal, wherein
 when the controller has detected a branch road ahead of the host vehicle on the basis of the captured image signal from the camera, and has received, from the turn signal switch, a turn signal activation signal indicating a direction toward the branch road ahead, the controller continues to perform the lane keeping control such that the vehicle travels toward the branch road ahead, and
 when there is an opposing lane between the host vehicle and the branch road ahead, the controller restrains the lane keeping control performed such that the vehicle travels toward the branch road ahead when the controller receives a turn signal activation signal indicating a direction toward the branch road ahead from the turn signal switch.

8. The lane keeping control device of claim 1, wherein the branch road detector determines on a basis of map data whether or not there is an opposing lane between the host vehicle and the branch road ahead.

* * * * *